United States Patent
Chen et al.

(10) Patent No.: US 12,463,529 B2
(45) Date of Patent: Nov. 4, 2025

(54) POWER FACTOR CORRECTION CONVERTER AND OPERATION METHOD THEREOF

(71) Applicant: Diodes Incorporated, Plano, TX (US)

(72) Inventors: Haoming Chen, Taipei (TW); Yi-Chun Wang, San Jose, CA (US); Koyen Lee, Taipei (TW); Feng-Jung Huang, Taoyuan (TW)

(73) Assignee: DIODES INCORPORATED, Plano, TX (US)

( * ) Notice: Subject to any disclaimer, the term of this patent is extended or adjusted under 35 U.S.C. 154(b) by 286 days.

(21) Appl. No.: 18/193,591

(22) Filed: Mar. 30, 2023

(65) Prior Publication Data
US 2024/0154520 A1 May 9, 2024

(30) Foreign Application Priority Data
Nov. 4, 2022 (CN) .......................... 202211381861.X

(51) Int. Cl.
*H02M 1/42* (2007.01)
*H02M 3/156* (2006.01)

(52) U.S. Cl.
CPC ............. *H02M 1/42* (2013.01); *H02M 3/156* (2013.01)

(58) Field of Classification Search
CPC .... H02M 1/42; H02M 1/4208; H02M 1/4216; H02M 1/4225; H02M 1/4233;
(Continued)

(56) References Cited

U.S. PATENT DOCUMENTS

| 8,120,347 B1* | 2/2012 | Cao | H02M 1/4225 |
| | | | 323/284 |
| 8,129,958 B2* | 3/2012 | Ku | H02M 1/4225 |
| | | | 323/222 |

(Continued)

FOREIGN PATENT DOCUMENTS

| CN | 1702948 A | 11/2005 |
| CN | 1578078 B | 8/2010 |

(Continued)

OTHER PUBLICATIONS

Extended European Search Report for European Application No. 23205917.0, mailed Mar. 20, 2024, 10 pages.

(Continued)

*Primary Examiner* — Jue Zhang
*Assistant Examiner* — Nusrat Quddus
(74) *Attorney, Agent, or Firm* — Kilpatrick Townsend & Stockton LLP

(57) ABSTRACT

A power factor correction (PFC) converter comprises an inductor, a main switch, a voltage divider, a diode, and a controller. The main switch controls the inductor performing magnetization and demagnetization, wherein a voltage difference between two ends of the main switch is a switch voltage. The voltage divider divides the switch voltage and generates a division voltage. The controller performs the following operations periodically in general mode: turning on the main switch; turning off the main switch after the main switch is turned on for a period of time; obtaining the switch voltage according to the division voltage, and determining the period of time for which the main switch is turned on next time according to the switch voltage and a predetermined output voltage of the PFC converter; and obtaining an output voltage according to the switch voltage during a period of time after the main switch is turned off.

19 Claims, 3 Drawing Sheets

(58) Field of Classification Search
CPC .. H02M 1/4241; H02M 1/425; H02M 1/4258; H02M 1/4266; H02M 2001/4275; H02M 2001/4283; H02M 2001/4291
See application file for complete search history.

(56) References Cited

U.S. PATENT DOCUMENTS

| | | | | |
|---|---|---|---|---|
| 8,248,040 | B2 * | 8/2012 | Rausch | H02M 3/1584 323/272 |
| 8,912,775 | B2 | 12/2014 | Feldtkeller et al. | |
| 2007/0085517 | A1 * | 4/2007 | Ribarich | G05F 1/70 323/235 |
| 2007/0247121 | A1 * | 10/2007 | Wu | G05F 1/70 323/222 |
| 2012/0195082 | A1 * | 8/2012 | Wrathall | H02M 1/4208 363/125 |
| 2013/0250620 | A1 | 9/2013 | Huang et al. | |
| 2014/0049181 | A1 * | 2/2014 | Kelly | H02M 1/42 323/207 |
| 2016/0190912 | A1 * | 6/2016 | Lim | H02M 1/4225 363/84 |
| 2016/0352234 | A1 | 12/2016 | Imai | |
| 2021/0391781 | A1 * | 12/2021 | Endo | H02M 1/4208 |

FOREIGN PATENT DOCUMENTS

| | | |
|---|---|---|
| CN | 102577057 A | 7/2012 |
| CN | 102792572 A | 11/2012 |
| CN | 102474184 B | 4/2016 |
| CN | 113141109 A | 7/2021 |
| EP | 1603219 A1 | 12/2005 |
| JP | 2016213996 A | 12/2016 |
| JP | 6180126 B2 | 8/2017 |
| JP | 2020014325 A | 1/2020 |
| TW | 201125271 A | 7/2011 |
| TW | 201611492 A | 3/2016 |

OTHER PUBLICATIONS

Office Action and Search Report from Taiwan Patent Application No. 112100488, dated Dec. 4, 2023, 5 pages.
Office Action for Japanese Patent Application No. 2023121165, mailed on Jul. 26, 2024, 18 pages.
Application No. JP2023-121165, Office Action mailed on Jul. 26, 2024, 14 pages.
Application No. JP2023-121165, Office Action mailed on Jan. 14, 2025, 5 pages.

* cited by examiner

POWER FACTOR CORRECTION CONVERTER AND OPERATION METHOD THEREOF

CROSS-REFERENCES TO RELATED APPLICATIONS

This application claims priority to Chinese patent application No. 202211381861.X, filed on Nov. 4, 2022 and entitled "POWER FACTOR CORRECTION CONVERTER AND OPERATION METHOD THEREOF", the disclosure of which is hereby incorporated by reference in its entirety.

TECHNICAL FIELD

The present invention relates to a converter, and in particular to a power factor correction converter.

BACKGROUND

A power factor correction converter can reduce the phase difference between voltage and current during voltage conversion. When being applied to high voltage (for example, in a transient mode or a discontinuous mode), the power factor correction converter needs to detect the voltage of two ends of a main switch and the voltage of an output end, respectively, in a complicated manner, such that the circuit layout area and the standby power consumption of the power factor correction converter are greatly increased. Therefore, how to reduce the circuit size and the standby power consumption of the power factor correction converter is one of the urgent problems to be solved in the art.

SUMMARY

One of the objectives of the present application is to disclose a power factor correction converter and an operation method thereof, so as to solve the above problems.

An embodiment of the present application relates to a power factor correction converter having an input end and an output end and operable in a normal mode, the power factor correction converter comprising an inductor, a main switch, a voltage divider, a diode, and a controller. A first end of the inductor is coupled to the input end. The main switch is coupled between a second end of the inductor and a ground end and configured to control the inductor to perform a magnetization operation and a demagnetization operation, wherein the voltage difference between two ends of the main switch is a switch voltage. The voltage divider is coupled to the two ends of the main switch, such that the voltage divider and the main switch are connected in parallel, and the voltage divider is configured to perform a voltage-division operation on the switch voltage to generate a divided voltage which is lower than the switch voltage. The diode is coupled to the output end and the second end of the inductor. The controller is coupled to the main switch and the voltage divider and is configured to, periodically in a normal mode: turn on the main switch; turn off the main switch after the main switch is turned on for a length of time; obtain the switch voltage according to the divided voltage generated by the voltage-division operation, and determine, according to the switch voltage and a predetermined output voltage of the power factor correction converter, the length of time for which the main switch is turned on next time; and obtain an output voltage according to the switch voltage within a length of time after the main switch is turned off.

Another embodiment of the present application relates to a power supply apparatus comprising the power factor correction converter and a voltage-adjusting circuit. The voltage-adjusting circuit is coupled to the output end and the controller of the power factor correction converter, and is configured to adjust the output voltage of the power factor correction converter to an adjusted voltage and generate a feedback signal according to the change in the adjusted voltage. The power factor correction converter is further operable in a dormant mode, and when the power factor correction converter is operated in the dormant mode, the frequency at which the main switch is turned on by the controller is lower than the frequency at which the main switch is turned on when the power factor correction converter is operated in the normal mode. When the power factor correction converter is operated in the dormant mode, the controller determines, according to the feedback signal, whether to increase the frequency of turning on the main switch.

Another embodiment of the present application relates to a method for operating a power factor correction converter. The power factor correction converter is operable in a normal mode, and the power factor correction converter comprises an inductor, a main switch, a voltage divider, and a diode. A first end of the inductor is coupled to an input end of the power factor correction converter; the main switch is coupled between a second end of the inductor and a ground end; the voltage difference between two ends of the main switch is a switch voltage; the voltage divider is coupled to the two ends of the main switch, such that the voltage divider and the main switch are connected in parallel; the diode is coupled to an output end of the power factor correction converter and the second end of the inductor. The method comprises, periodically in the normal mode: turning on the main switch; turning off the main switch after the main switch is turned on for a length of time; obtaining the switch voltage according to a divided voltage which is generated by a voltage-division operation performed on the switch voltage by the voltage divider and is lower than the switch voltage, and determining, according to the switch voltage and a predetermined output voltage of the power factor correction converter, the length of time for which the main switch is turned on next time; and obtaining an output voltage according to the switch voltage within a length of time after the main switch is turned off.

Another embodiment of the present application relates to a method for operating a power supply apparatus. The power supply apparatus comprises a power factor correction converter. The method comprises: adjusting an output voltage of the power factor correction converter to an adjusted voltage; and generating a feedback signal according to the change in the adjusted voltage, such that a controller of the power factor correction converter operated in a dormant mode determines whether to increase the frequency of turning on a main switch of the power factor correction converter.

The power factor correction converter of the present application takes the switch voltage detected after the main switch is turned off as the output voltage, and thus, only one group of voltage dividers is required to detect the switch voltage and obtain the output voltage, so that the circuit design area and the standby power consumption of the power factor correction converter of the present application can be significantly reduced compared with the circuit design area and the power consumption of a common power factor correction converter.

BRIEF DESCRIPTION OF THE DRAWINGS

The aspects of the disclosure are better understood from the following embodiments during reading in conjunction with the accompanying drawings. It should be noted that, according to standard practice in the industry, various structures are not drawn to scale. In fact, for clarity of discussion, the sizes of various structures may be arbitrarily increased or decreased.

DETAILED DESCRIPTION

Figure 1:
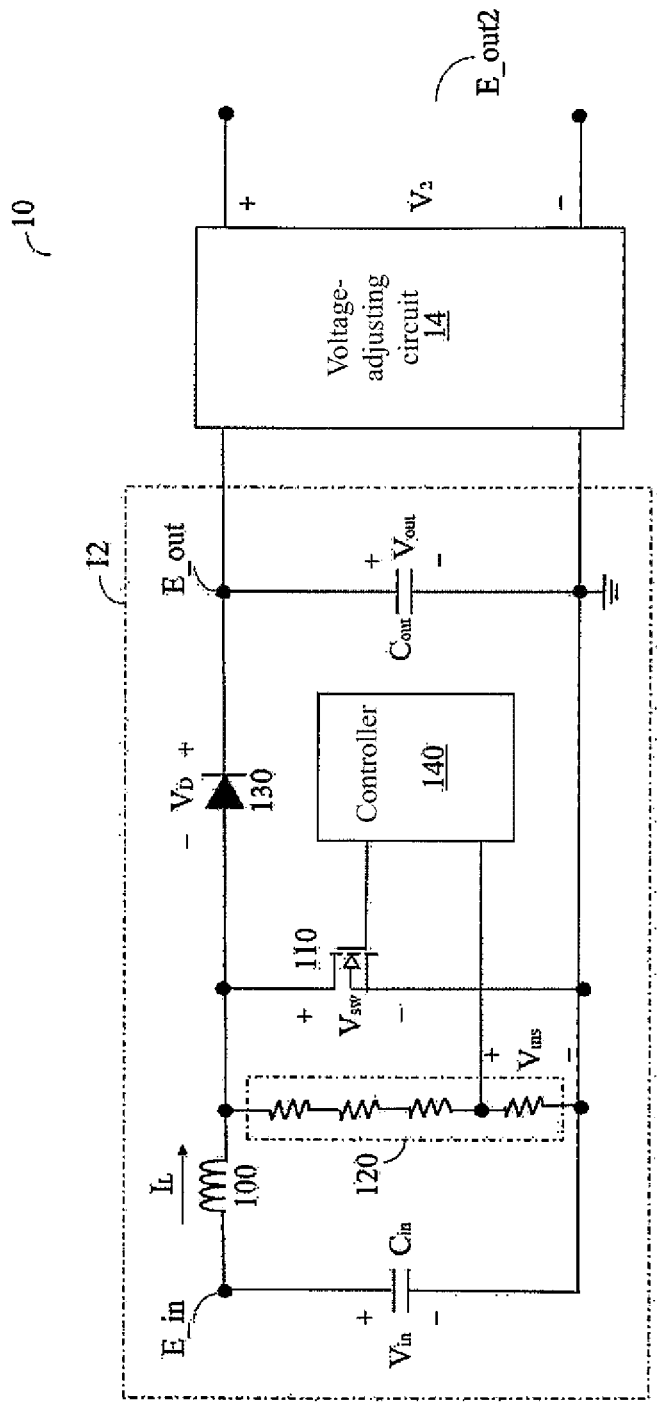
FIG. 1 is a schematic diagram of an embodiment of a power supply apparatus according to the present application.

The disclosure below provides numerous different embodiments or examples for implementing different structural members of the provided subject matter. Specific examples of assemblies and arrangements are described below to simplify the present disclosure. Of course, the foregoing are merely examples and are not intended to be limiting. For example, in the following description, a first structural member being formed above or on a second structural member may include an embodiment in which the first structural member and the second structural member are in direct contact with each other, and may also include an embodiment in which an additional structural member is formed between the first structural member and the second structural member, such that the first structural member and the second structural member may not be in direct contact with each other. In addition, the present disclosure may make repeated references to numbers and/or letters in various examples. This repetition is for the purpose of simplicity and clarity and does not in itself indicate a relationship between various embodiments and/or configurations discussed.

In addition, for the convenience of description, spatially relative terms, for example, "beneath," "below," "lower," "above," "upper," "on," etc., may be used herein to describe a relationship between one assembly or structural member and another assembly or structural member described in the figure. In addition to the orientation depicted in the figure, the spatially relative terms may be intended to encompass different orientations of an apparatus in use or operation. An apparatus may be otherwise oriented (by rotating 90 degrees or at other orientations) and accordingly, spatially relative descriptors used herein may likewise be interpreted.

As used herein, terms such as "first," "second," and "third" are used to describe various assemblies, structural members, areas, layers and/or sections, but such assemblies, structural members, areas, layers and/or sections should not be limited by such terms. Such terms may only be used to distinguish one assembly, structural member, area, layer, or section from another. Terms such as "first," "second," and "third" do not imply a sequence or order when being used herein unless expressly indicated by the context.

The singular forms "a," "an," and "the" may also include plural forms unless the context clearly indicates otherwise. The term "connection" along with derivatives thereof may be used herein to describe a structural relationship between components. "Connection" may be used to describe that two or more assemblies are in direct physical or electrical contact with each other. "Connection" may also be used to indicate that two or more assemblies are in direct or indirect (with an intervening assembly between them) physical or electrical contact with each other, and/or the two or more assemblies cooperate or interact with each other.

A voltage converter may adjust an AC input voltage to a target output voltage. During the conversion process, if the phase difference between the generated voltage and the current is too large, the gap between the active power of the voltage converter and the apparent power is too large. The voltage converter can reduce the phase difference between the voltage and the current by importing power factor correction (PFC), such that the input current of the voltage converter is close to a current in a pure resistance load, and thus the active power is close to the apparent power.

In some embodiments, in an application where the power factor correction converter is at high voltage (such as in a transient mode or a discontinuous mode), two groups of voltage dividers are used for performing a voltage-division operation on the voltage of two ends of a main switch and the output voltage, respectively, and a controller therein requires two input ends to be connected to the two groups of voltage dividers, so as to detect the divided voltage of the two ends of the main switch and the divided voltage of the output voltage subjected to the voltage-division operation. However, to further reduce the layout area of a resistor included in the voltage divider in the circuit design and reduce the standby power consumption of the power factor correction converter, the present application further provides other embodiments as follows.

In particular, the present application discloses a power factor correction converter and an operation method thereof. Only one group of voltage dividers can be used for detecting the voltage of two ends of a main switch, and then an output voltage is obtained according to the characteristic that the voltage between the two ends of the main switch is approximate to the output voltage. The power factor correction converter and the operation method thereof will be further described as follows.

FIG. 1 is a schematic diagram of an embodiment of a power supply apparatus 10 according to the present application. In FIG. 1, the power supply apparatus 10 includes a power factor correction converter 12 and a voltage-adjusting circuit 14. The power factor correction converter 12 has an input end E_in and an output end E_out, and is operable in a normal mode. The input end E_in may be coupled to a full-wave rectifier circuit (not shown). The full-wave rectifier circuit may convert an AC voltage received from the outside (e.g., a wall socket) into a rectified voltage by performing a rectification operation. The rectified voltage may serve as an input voltage $V_{in}$ which bridges a capacitor Cm of the power factor correction converter 12. The output end E_out is configured to receive an output voltage $V_{out}$ generated by the power factor correction converter 12. The output voltage may bridge a capacitor Cont. The voltage-adjusting circuit 14 is coupled to the output end E_out of the power factor correction converter 12, and is configured to adjust the output voltage $V_{out}$ of the power factor correction converter 12 to generate an adjusted voltage $V_2$. In some embodiments, the voltage-adjusting circuit 14 may be implemented using a switching buck converter or boost converter. In applications where power conversion efficiency is not strictly required, the voltage-adjusting circuit 14 may be a linear voltage adjuster. The voltage-adjusting circuit 14 has an output end E_out2, configured to couple to a load or an electronic apparatus (not shown). The voltage-adjusting circuit 14 may supply the generated adjusted voltage $V_2$ to the load or the electronic apparatus.

The power factor correction converter 12 includes an inductor 100, a main switch 110, a voltage divider 120, a diode 130, and a controller 140.

A first end of the inductor 100 is coupled to an input end E_in of the power factor correction converter 12, and is configured to generate, according to an input voltage $V_{in}$, a magnetic field to store energy. The stored energy may be provided to generate an output voltage $V_{out}$ to an output end E_out.

The main switch 110 is coupled between a second end of the inductor 100 and a ground end and is configured to control the inductor 100 to perform a magnetization operation and a demagnetization operation. When the main switch 110 is turned on, the input voltage yin provides an inductive current $I_L$ flowing through the inductor 100. The inductive current $I_L$ increases with time, such that the inductor 100 performs a magnetization operation and stores energy. After energy is stored for a period of time, the main switch 110 is turned off, and the inductive current $I_L$ flowing through the inductor 100 decreases with time, such that the inductor 100 releases the stored energy and performs a demagnetization operation. In addition, the voltage difference between two ends of the main switch is a switch voltage $V_{sw}$.

The voltage divider 120 is coupled to the two ends of the main switch 110, such that the voltage divider 120 and the main switch 110 are connected in parallel. The voltage divider 120 is configured to perform a voltage-division operation on the switch voltage $V_{sw}$ to generate a divided voltage $V_{ms}$ which is lower than the switch voltage $V_{sw}$. Generally, the switch voltage $V_{sw}$ of the power factor correction converter 12 is at a high voltage and cannot be directly detected by the power factor correction converter 12. Instead, it is necessary to perform a voltage-division operation on the switch voltage $V_{sw}$ by means of the voltage divider 120 to generate a divided voltage $V_{ms}$ which is lower than the switch voltage $V_{sw}$. There is a multiple relationship between the switch voltage $V_{sw}$ and the divided voltage $V_{ms}$ which is generated by the voltage-division operation. After the power factor correction converter 12 detects the divided voltage $V_{ms}$, the magnitude of the switch voltage $V_{sw}$ can be obtained by means of the multiple relationship.

The diode 130 is coupled to the output end E_out and the second end of the inductor 100. When the main switch 110 is turned on, the diode 130 is turned off. When the main switch 110 is turned off, the diode 130 is turned on, such that when the inductor 100 performs a demagnetization operation, the stored energy is provided to the output end E_out to generate an output voltage $V_{out}$. When the diode 130 is turned on, two ends of the diode 130 will generate a turn-on voltage $V_D$. Generally, the turn-on voltage $V_D$ is about 0.7-1 volt.

When the main switch 110 is turned off, the relationship among the switch voltage $V_{sw}$, the turn-on voltage $V_D$, and the output voltage $V_{out}$ may be written as an equation (Eq. 1):

$$V_{sw} = -V_D + V_{out} \quad \text{(Eq. 1)}.$$

Because the magnitudes of the switch voltage $V_{sw}$ and the output voltage $V_{out}$ are hundreds of volts, and the magnitude of the turn-on voltage $V_D$ is only 0.7-1 volt, the magnitude of the turn-on voltage $V_D$ is far less than the magnitudes of the switch voltage $V_{sw}$ and the output voltage $V_{out}$. In other words, the magnitude of the turn-on voltage $V_D$ may be ignored, and the magnitude of the switch voltage $V_{sw}$ is approximate to that of the output voltage $V_{out}$. Therefore, when the magnitude of the obtained output voltage $V_{out}$ is not required to be very accurate, and when only one group of voltage dividers 120 is used, the power factor correction converter 12 may take the magnitude of the switch voltage $V_{sw}$ as the magnitude of the output voltage $V_{out}$, and another group of voltage dividers is not required to perform a voltage-division operation on the output voltage $V_{out}$ to obtain the output voltage $V_{out}$, thereby saving the circuit layout area in the design of the power factor corrector 12. The suitable voltage magnitude of the output voltage $V_{out}$ may be 50 volts or more; or depending on the specific application requirements, the voltage magnitude of the output voltage $V_{out}$ may also be 50 volts or less.

The controller 140 is coupled to the main switch 110 and the voltage divider 120, and is configured to control the main switch 110 to be turned on or off, and is configured to detect the divided voltage $V_{ms}$ generated after the voltage divider 120 performs a voltage-division operation on the switch voltage $V_{sw}$.

Figure 2:
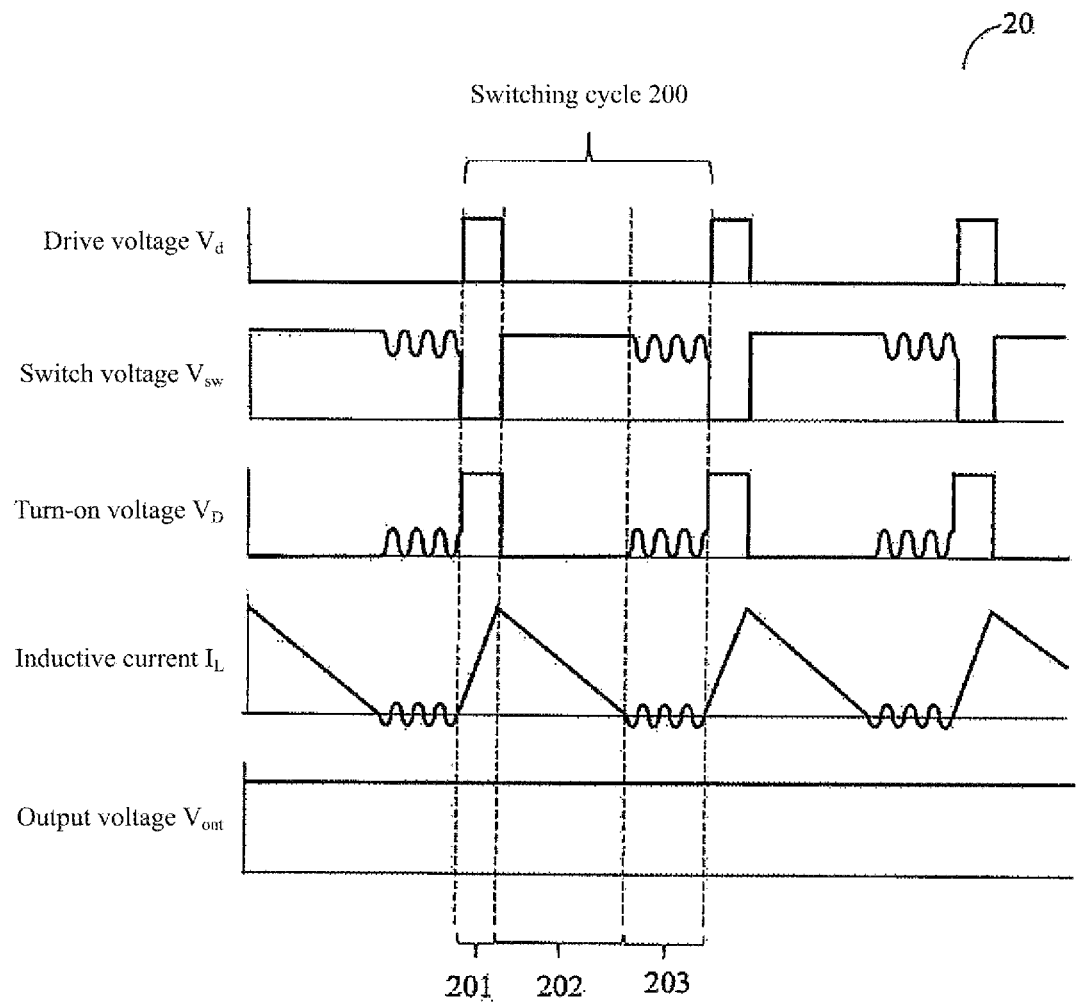
FIG. 2 is a voltage or current waveform diagram of each assembly in a power factor correction converter according to the present application.

FIG. 2 is a voltage or current waveform diagram 20 of each assembly in the power factor correction converter 12 according to the present application. In FIG. 2, the horizontal axis is time, and the longitudinal axis is, sequentially from top to bottom, that the controller 140 controls a drive voltage $V_d$ of the main switch 110, the switch voltage $V_{sw}$ of the main switch 110, the turn-on voltage $V_D$ of the diode 130, the inductive current $I_L$ flowing through the inductor 100, and the output voltage $V_{out}$. A complete switching cycle 200 includes: the controller 140 turning on the main switch 110, the controller 140 turning off the main switch 110, and then the controller 140 turning on the main switch 110 again.

Refer to FIG. 1 and FIG. 2 at the same time. When the power factor correction converter 12 is operated in the normal mode, the controller 140 periodically performs the following steps:

first, the controller 140 turns on the main switch 110, such that the inductor 100 performs a magnetization operation, and the inductive current $I_L$ passing through the inductor 100 rises, such that energy for the output voltage $V_{out}$ is stored. The foregoing step may correspond to a first stage 201 of the switching cycle 200 in FIG. 2 At the moment when the switching cycle 200 enters the first stage 201, the drive voltage $V_d$ rises from 0 to turn on the main switch 110; after the main switch 110 is turned on, the inductor 100 starts a magnetization operation, and the inductive current $I_L$ flowing through the inductor 100 gradually rises from 0; and since the main switch 110 is turned on, the switch voltage $V_{sw}$ of the two ends of the main switch 110 is 0.

Then, after the main switch 110 is turned on for a length of time, the controller 140 turns off the main switch 110, such that the inductor 100 performs a demagnetization operation and releases the stored energy to generate an output voltage $V_{out}$, the diode 130 is turned on, and the inductive current $I_L$ passing through the inductor 100 drops; and the controller 140 obtains the switch voltage $V_{sw}$ according to the divided voltage $V_{ms}$ generated by the voltage-division operation, and the controller 140 determines, according to the switch voltage $V_{sw}$ and a predetermined output voltage of the power factor correction converter 12, the length of time for which the main switch 110 is turned on next time. The foregoing step may correspond to a second stage 202 of the switching cycle 200 in FIG. 2. At the moment when the switching cycle 200 enters the second stage 202, the drive voltage $V_d$ of the main switch 110 is controlled to drop to 0 to turn off the main switch 110; after the main switch 110 is turned off, the inductor 100 starts a demagnetization operation, and the inductive current $I_L$ flowing through the inductor 100 gradually drops; at this time, the diode 130 is turned on and two ends of the diode 130 have a turn-on voltage $V_D$ of about 0.7-1 volt; and according to the equation (Eq. 1), when the magnitude of the turn-on voltage is far less than the magnitudes of the switch voltage $V_{sw}$ and the output voltage $V_{out}$, the magnitude of the switch voltage $V_{sw}$ is almost equal to that of the output voltage $V_{out}$. The controller 140 may obtain the magnitude of the output voltage $V_{out}$ by detecting the switch voltage $V_{sw}$ at the second stage 202.

In addition, the controller 140 determines the length of time for which the main switch 110 is turned on next time by comparing the obtained switch voltage $V_{sw}$ with the predetermined output voltage of the power factor correction converter 12. For example, if the switch voltage $V_{sw}$ obtained by the controller 140 is lower than the predetermined output voltage, the controller 140 determines that the length of time for which the main switch $V_{sw}$ is turned on next time is increased, such that the inductor 100 can store more energy at the stage when the main switch 110 is turned on next time, and thus the output voltage $V_{out}$ reaches the magnitude of the predetermined output voltage. Conversely, if the switch voltage $V_{sw}$ obtained by the controller 140 is higher than the predetermined output voltage, the controller 140 determines that the length of time for which the main switch 110 is turned on next time is decreased, such that the inductor 100 stores less energy at the stage when the main switch 110 is turned on next time, and thus the output voltage $V_{out}$ reaches the magnitude of the predetermined output voltage.

Finally, after the inductor 100 completes the demagnetization operation, the inductive current $I_L$ flowing through the inductor 100 drops to 0, and the switch voltage $V_{sw}$ starts a resonance, such that the switch voltage $V_{sw}$ is between a peak value and a valley value of the resonance. To minimize energy loss when the main switch 110 is switched, the controller 140 turns on the main switch 110 only when the switch voltage $V_{sw}$ is at the valley value of the resonance. This step may correspond to a third stage 203 of the switching cycle 200 in FIG. 2. After the switching cycle 200 enters the third stage 203, since the main switch 110 is still turned off, the drive voltage $V_d$ of the main switch 110 is controlled to still be 0. After the demagnetization operation is completed, the switch voltage $V_{sw}$ and the inductive current $I_L$ start a resonance. Since the ratio of the switch voltage $V_{sw}$ to the divided voltage $V_{ms}$ is a constant value, when the controller 140 is based on the detected divided voltage $V_{ms}$ being at the valley value of the resonance (the current switch voltage $V_{sw}$ also being at the valley value of the resonance), the controller 140 turns on the main switch 110, such that the switching cycle 200 enters the first stage 201 from the third stage 203 so as to enter the next switching cycle 200. Upon entering the first stage 201 of the next switching cycle 200, according to the length of time for which the main switch 110 is turned on that was previously determined in the second stage 202, the controller 140 turns on the main switch 110 for the length of time.

According to the above description, it can be seen that the power factor correction converter 12 is given a predetermined output voltage in advance. Since the time for which the main switch 110 is turned on is associated with energy stored by the inductor 100 to provide the output voltage $V_{out}$, according to whether the switch voltage $V_{sw}$ obtained by back deduction from the divided voltage $V_{ms}$ (according to the above description, the magnitude of the switch voltage $V_{sw}$ may be directly approximated to the magnitude of the output voltage $V_{out}$) reaches the predetermined output voltage, the controller 140 can dynamically adjust the time for which the main switch 110 is turned on next time, such that the switch voltage $V_{sw}$ reaches the predetermined output voltage.

It should be noted that the power factor correction converter 12 of the present application can only use the magnitude of the switch voltage $V_{sw}$ to obtain the magnitude of the output voltage $V_{out}$ at the second stage 202 of the switching cycle 200 in FIG. 2. In practice, the switch voltage $V_{sw}$ can be detected within a very short time after the main switch 110 is turned off (namely, entering the second stage 202 from the first stage 201), or the switch voltage $V_{sw}$ which has been a constant value within a previous period of time (namely, the second stage 202) can be detected after the switch voltage $V_{sw}$ starts a resonance (namely, entering the third stage 203 from the second stage 202).

The power factor correction converter 12 may be operated in a dormant mode in addition to the normal mode. For example, after the controller 140 has stably adjusted the output voltage $V_{out}$ to the magnitude of the predetermined output voltage, the power factor correction converter 12 enters the dormant mode, such that the frequency at which the main switch 110 is turned on by the controller 140 is lower than the frequency at which the main switch 110 is turned on when the power factor correction converter 12 is operated in the normal mode. That is, when the power factor correction converter 12 enters the dormant mode, the frequency of switching the main switch 110 between on and off is reduced, and switching between on and off of the main switch 110 can even be completely stopped. However, since the power factor correction converter 12 can only obtain the output voltage $V_{out}$ through the switch voltage $V_{sw}$ at the second stage 202 in FIG. 2, when the output voltage $V_{out}$ deviates from the predetermined output voltage due to the load change of the output end E_out or other factors, the power factor correction converter 12 in the dormant mode cannot maintain in real time the output voltage $V_{out}$ at the predetermined output voltage, resulting in the reduction of the output load regulation capability. To improve this problem, the power factor correction converter 12 of the present application can also use an output signal of the voltage-adjusting circuit as a reference to determine whether to wake up the power factor correction converter 12 in the dormant mode from the dormant mode to enter the normal mode, such that the power factor correction converter 12 can maintain in real time the output voltage $V_{out}$ at the predetermined output voltage in view of the load change or other factors which cause the output voltage $V_{out}$ to deviate from the predetermined output voltage.

Figure 3:
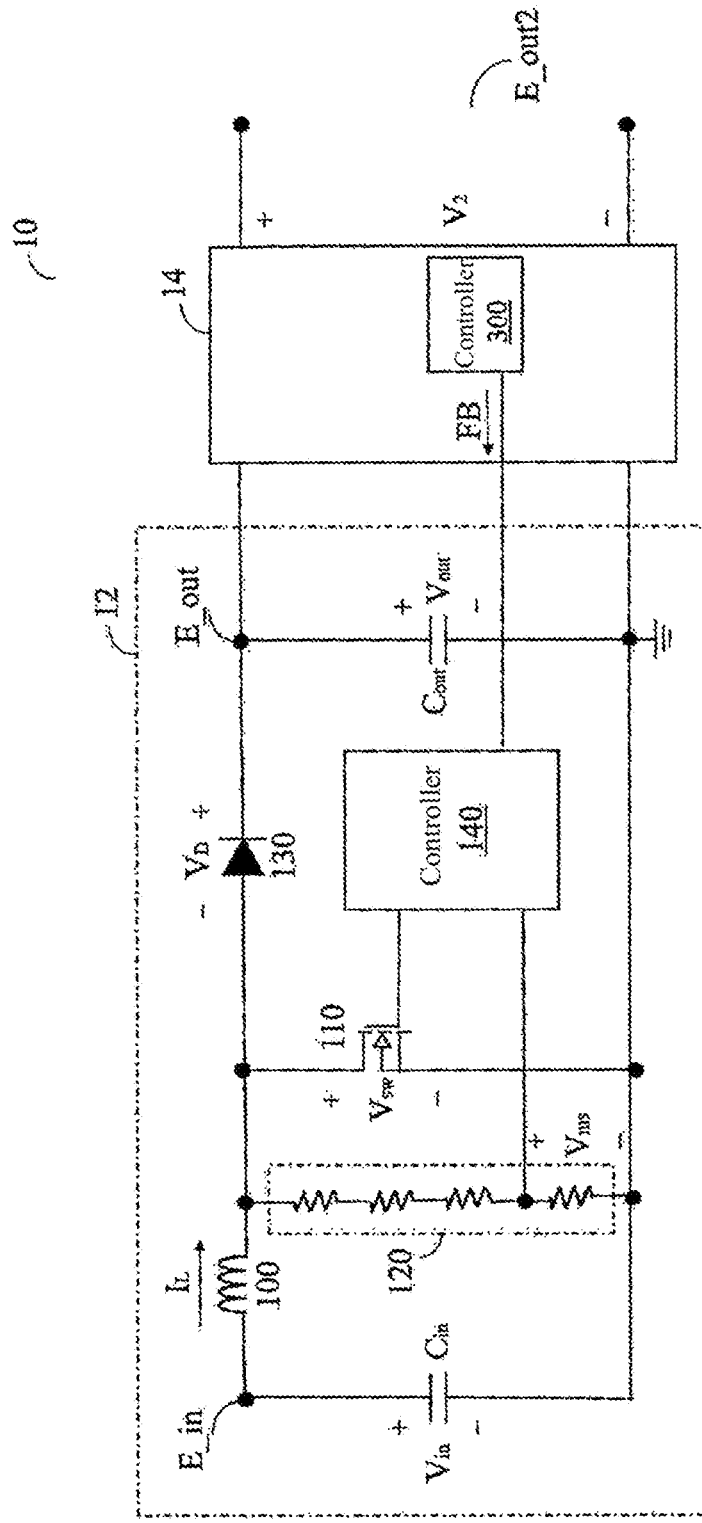
FIG. 3 is a schematic diagram of an embodiment of a power supply apparatus according to the present application.

FIG. 3 is a schematic diagram of an embodiment of a power supply apparatus 10 according to the present application. In FIG. 3, the power supply apparatus 10 includes a power factor correction converter 12, and a voltage-adjusting circuit 14 which is serially connected to the power factor correction converter 12.

The voltage-adjusting circuit 14 is coupled to an output end E_out of the power factor correction converter 12, and is configured to adjust an output voltage $V_{out}$ of the power factor correction converter 12 to an adjusted voltage $V_2$. For example, the voltage-adjusting circuit 14 may include a transformer (not shown in FIG. 3) and is configured to convert the output voltage $V_{out}$ of the power factor correction converter 12 to the adjusted voltage $V_2$ and enable the output voltage $V_{out}$ and the adjusted voltage $V_2$ to have a multiple relationship.

The voltage-adjusting circuit 14 may include a controller 300. The controller 300 is coupled to a controller 140 of the power factor correction converter 12, and is configured to generate a feedback signal FB according to the change in the adjusted voltage $V_2$. When the power factor correction converter 12 is operated in a dormant mode, the controller 140 determines, according to the feedback signal FB, whether to increase the frequency of turning on the main switch 110. That is, when the output voltage $V_{out}$ deviates from a predetermined output voltage due to the load change of the output end E_out or other factors, the output voltage $V_{out}$ cannot be maintained at the predetermined output voltage and will change, and the adjusted voltage $V_2$ which has a multiple relationship with the output voltage $V_{out}$ will also change accordingly. The voltage-adjusting circuit 14 may know according to the change in the adjusted voltage $V_2$ that the output voltage $V_{out}$ of the power factor correction converter 12 changes, and thus generate a feedback signal FB to inform the power factor correction converter 12 operated in the dormant mode. After the feedback signal FB is received, the controller 140 of the power factor correction converter 12 determines whether to increase the frequency of turning on the main switch 110. When the feedback signal indicates that the difference between the adjusted voltage $V_2$ and the predetermined adjusted voltage is greater than a critical value, the controller 140 increases the frequency of turning on the main switch 110, or controls the power factor correction converter 12 to enter the normal mode from the dormant mode, such that the power factor correction converter 12 can maintain in real time the output voltage $V_{out}$ at the predetermined output voltage.

In conclusion, the power factor correction converter of the present application can, when using only one group of voltage dividers, obtain the voltage value of the output voltage from the detected voltage of the two ends of the switch according to the characteristic that the magnitude of the voltage of the two ends of the switch is approximate to the magnitude of the output. Compared with existing power factor correction converters using two groups of voltage dividers, the power factor correction converter of the present application not only saves the circuit layout area during design, but also reduces the standby power consumption of the power factor correction converter due to the reduction of one group of voltage dividers.

The foregoing summarizes the structures of several embodiments, which enables those skilled in the art to better understand the aspects of the present disclosure. Those skilled in the art should appreciate that they may readily use the present disclosure as a basis for designing or modifying other manufacturing processes and structures for carrying out the same purposes and/or achieving the same advantages of the embodiments introduced herein. Those skilled in the art should also realize that such equivalent constructions do not depart from the spirit and scope of the present disclosure, and various changes, substitutions, and alterations can be made herein without departing from the spirit and scope of the present disclosure.

What is claimed is:

1. A power supply apparatus comprising:
    a power factor correction converter having an input end and an output end and operable in a normal mode, the power factor correction converter comprising:
        an inductor, a first end of the inductor being coupled to the input end;
        a main switch, coupled between a second end of the inductor and a ground end and configured to control the inductor to perform a magnetization operation and a demagnetization operation, wherein a voltage difference between two ends of the main switch is a switch voltage;
        a voltage divider, coupled to the two ends of the main switch, such that the voltage divider and the main switch are connected in parallel, the voltage divider being configured to perform a voltage-division operation on the switch voltage to generate a divided voltage lower than the switch voltage;
        a diode, coupled to the output end and the second end of the inductor;
        a controller, coupled to the main switch and the voltage divider and configured to, periodically in the normal mode:
            turn on the main switch;
            turn off the main switch after the main switch is turned on for a length of time;
            obtain the switch voltage according to the divided voltage generated by the voltage-division operation, and determine, according to the switch voltage and a predetermined output voltage of the power factor correction converter, the length of time for which the main switch is turned on next time; and
            obtain an output voltage according to the switch voltage within a length of time after the main switch is turned off; and
    a voltage-adjusting circuit coupled to the output end and the controller of the power factor correction converter and configured to adjust the output voltage of the power factor correction converter to an adjusted voltage and generate a feedback signal according to a change in the adjusted voltage;
    wherein:
        a frequency at which the main switch is turned on by the controller when the power factor correction converter is operated in a dormant mode is lower than a frequency at which the main switch is turned on when the power factor correction converter is operated in the normal mode; and
        the controller determines, according to the feedback signal, whether to increase the frequency at which the main switch is turned on when the power factor correction converter is operated in the dormant mode.

2. The power supply apparatus according to claim 1, wherein when the controller turns on the main switch, the inductor starts the magnetization operation, and an inductive current passing through the inductor rises.

3. The power supply apparatus according to claim 1, wherein when the controller turns off the main switch, the inductor starts the demagnetization operation, the diode is turned on, and an inductive current passing through the inductor drops.

4. The power supply apparatus according to claim 1, wherein when an inductive current drops to zero, the switch voltage starts a resonance, such that the switch voltage is between a peak value and a valley value of the resonance.

5. The power supply apparatus according to claim 4, wherein when the switch voltage is at the valley value of the resonance, the controller turns on the main switch.

6. The power supply apparatus according to claim 1, wherein if the switch voltage obtained by the controller is lower than the predetermined output voltage, the controller determines that the length of time for which the main switch is turned on next time is increased.

7. The power supply apparatus according to claim 1, wherein if the switch voltage obtained by the controller is higher than the predetermined output voltage, the controller determines that the length of time for which the main switch is turned on next time is decreased.

8. The power supply apparatus according to claim 1, wherein:
the power factor correction converter is further operable in a dormant mode; when the power factor correction converter is operated in the dormant mode, the frequency at which the main switch is turned on by the controller is lower than the frequency at which the main switch is turned on when the power factor correction converter is operated in the normal mode; and when the power factor correction converter is operated in the dormant mode, the controller determines, according to the feedback signal, whether to increase the frequency at which the main switch is turned on.

9. The power supply apparatus according to claim 8, wherein when the feedback signal indicates that a difference between the adjusted voltage and a predetermined adjusted voltage is greater than a critical value, the controller increases the frequency at which the main switch is turned on, or controls the power factor correction converter to enter the normal mode.

10. A method for operating a power supply apparatus, characterized in that the power supply apparatus comprises a power factor correction converter and a voltage-adjusting circuit coupled to an output end of the power factor correction converter, and the power factor correction converter is operable in a normal mode; the power factor correction converter comprises an inductor, a main switch, a voltage divider, and a diode; a first end of the inductor is coupled to an input end of the power factor correction converter; the main switch is coupled between a second end of the inductor and a ground end; a voltage difference between two ends of the main switch is a switch voltage; the voltage divider is coupled to the two ends of the main switch, such that the voltage divider and the main switch are connected in parallel; the diode is coupled to an output end of the power factor correction converter and the second end of the inductor; and the method comprises, periodically in the normal mode:
turning on the main switch;
turning off the main switch after the main switch is turned on for a length of time;
obtaining the switch voltage according to a divided voltage generated by a voltage-division operation performed on the switch voltage by the voltage divider and lower than the switch voltage, and determining, according to the switch voltage and a predetermined output voltage of the power factor correction converter, the length of time for which the main switch is turned on next time;
obtaining an output voltage according to the switch voltage within a length of time after the main switch is turned off;
adjusting, by the voltage-adjusting circuit, an output voltage of the power factor correction converter to an adjusted voltage; and
generating, by the voltage-adjusting circuit, a feedback signal according to a change in the adjusted voltage, such that a controller of the power factor correction converter operated in a dormant mode determines whether to increase a frequency of turning on a main switch of the power factor correction converter.

11. The method according to claim 10, wherein when the main switch is turned on, the inductor starts a magnetization operation, and an inductive current passing through the inductor rises.

12. The method according to claim 10, wherein when the main switch is turned off, the inductor starts a demagnetization operation, the diode is turned on, and an inductive current passing through the inductor drops.

13. The method according to claim 10, wherein when an inductive current drops to zero, the switch voltage starts a resonance, such that the switch voltage is between a peak value and a valley value of the resonance.

14. The method according to claim 13, further comprising:
turning on the main switch when the switch voltage is at the valley value of the resonance.

15. The method according to claim 10, further comprising:
if the switch voltage obtained by the power factor correction converter is lower than the predetermined output voltage, determining that the length of time for which the main switch is turned on next time is increased.

16. The method according to claim 10, further comprising:
if the switch voltage obtained by the power factor correction converter is higher than the predetermined output voltage, determining that the length of time for which the main switch is turned on next time is decreased.

17. A method for operating a power supply apparatus, characterized in that the power supply apparatus comprises a power factor correction converter; and the method comprises:
adjusting an output voltage of the power factor correction converter to an adjusted voltage; and
generating a feedback signal according to a change in the adjusted voltage, such that a controller of the power factor correction converter operated in a dormant mode determines whether to increase a frequency at which a main switch of the power factor correction converter is turned on, wherein when the feedback signal indicates that a difference between the adjusted voltage and a predetermined adjusted voltage is greater than a critical value, the controller increases the frequency at which the main switch is turned on, or controls the power factor correction converter to enter a normal mode.

18. The method according to claim 17, wherein the power factor correction converter comprises:
an input end and an output end;
an inductor, a first end of the inductor being coupled to the input end;
a main switch, coupled between a second end of the inductor and a ground end and configured to control the inductor to perform a magnetization operation and a demagnetization operation, wherein a voltage difference between two ends of the main switch is a switch voltage;
a voltage divider, coupled to the two ends of the main switch, such that the voltage divider and the main switch are connected in parallel, the voltage divider being configured to perform a voltage-division operation on the switch voltage to generate a divided voltage lower than the switch voltage;
a diode, coupled to the output end and the second end of the inductor; and
a controller, coupled to the main switch and the voltage divider and configured to, periodically in the normal mode:
turn on the main switch;

turn off the main switch after the main switch is turned on for a length of time;

obtain the switch voltage according to the divided voltage generated by the voltage-division operation, and determine, according to the switch voltage and a predetermined output voltage of the power factor correction converter, the length of time for which the main switch is turned on next time; and obtain an output voltage according to the switch voltage within a length of time after the main switch is turned off.

19. The method according to claim 18, wherein when the controller turns on the main switch, the inductor starts the magnetization operation, and an inductive current passing through the inductor rises.

* * * * *